Nov. 5, 1963  R. LANZANOVA  3,109,467
FRUIT AND VEGETABLE COMMINUTOR AND SEPARATOR
Filed Feb. 17, 1961
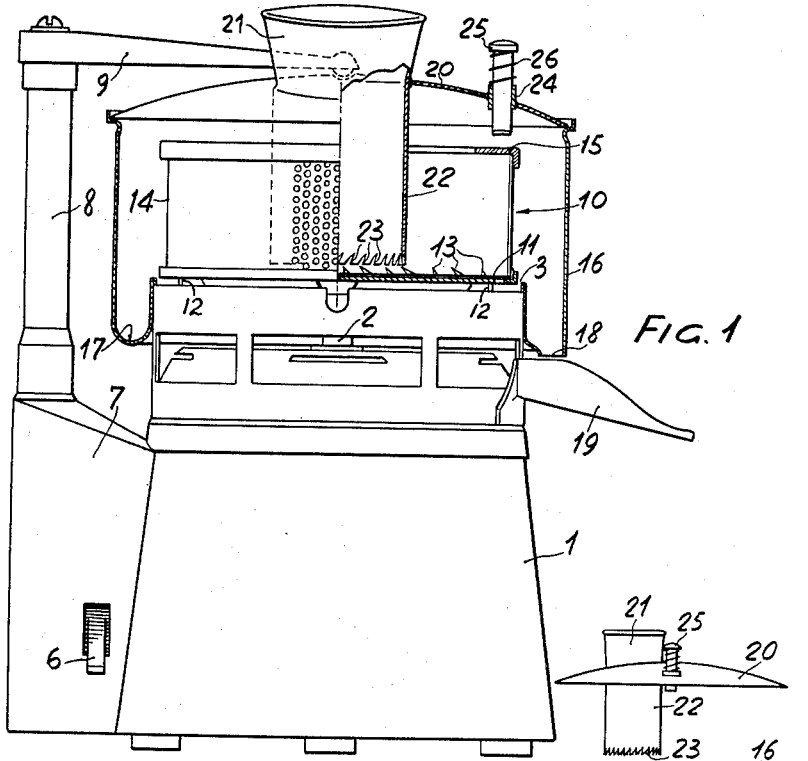
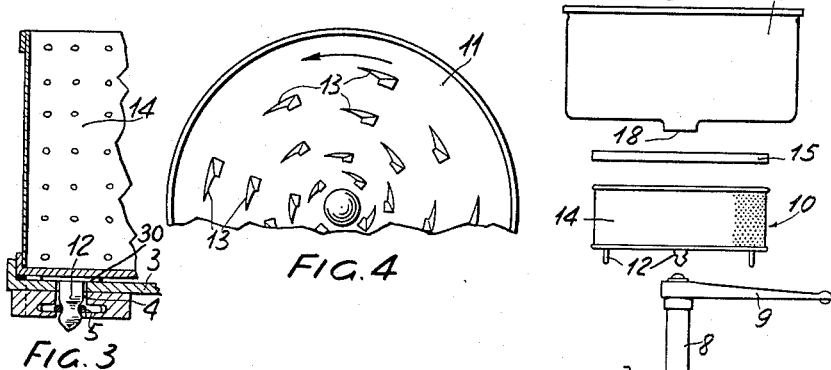
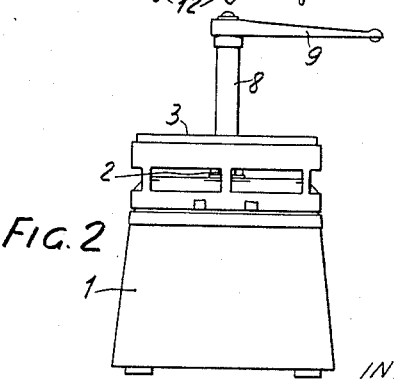
INVENTOR
RENATO LANZANOVA
BY
OSTROLENK, FABER, GERB & SOFFEN
ATTORNEY

United States Patent Office 3,109,467
Patented Nov. 5, 1963

3,109,467
FRUIT AND VEGETABLE COMMINUTOR
AND SEPARATOR
Renato Lanzanova, via Medaglie d'Oro 5,
Somma Lombardo, Italy
Filed Feb. 17, 1961, Ser. No. 90,040
Claims priority, application Italy Mar. 15, 1960
8 Claims. (Cl. 146—76)

Several types of centrifugal action devices for the grinding or generally for the treatment of fruits, vegetables and other foodstuffs to transform them into dense or pulpous liquids as fruit-juices, vegetable-juices or the like are already known at the present time. All these conventional apparatuses or devices present however the prejudicial inconvenience that the container suited to receive the substances to be ground is mounted in a somewhat unstable manner so that it tends to vibrate. These vibrations are especially severe at the starting and at the stopping of the operation of the machine. The grinding action of such centrifugal machines is furthermore often unsatisfactory because of the fact that the toughest parts, as for instance the peels, do not get ground and stick to the container thus hindering the proper operation of the machine and causing the vibration thereof. Furthermore the conventional centrifugal machines of such a type are complex to assemble and disassemble and the cleaning thereof is particularly toilsome.

An object of the invention is to provide a grinding device that overcomes the above mentioned inconveniences.

Another object of the invention is to provide a grinding device which operates in a rapid and reliable manner.

A further object of the present invention is to provide a grinding device for producing a uniform and homogeneous output product.

A still further object of the invention is to provide a grinding device that does not get jammed in operation and may be easily and perfectly cleaned upon usage thereof.

The centrifugal action device for grinding fruits, vegetables and other foodstuffs comprises, according to the invention, a base piece 1 enclosing a motor with a vertical shaft, the upper end of which protrudes upwards and is fixed to a heavy plate or disk. A container formed with a solid bottom is adapted to be removably snap-fixed to the disk. Fastened to the edge of the disk is a cylindrical perforated band like element of the container. A casing surrounds the container and is mounted to be quickly removable from the base piece. The casing is provided with an output opening. The open end of the casing is adapted to be closed by a cover provided with a member for the feeding into the container of the products to be ground. Means are within the container for grinding or breaking the product contained therein.

Further objects, characteristics and advantages of the present invention will become more readily apparent from the following detailed description of a particular embodiment given by way of example only with reference to the accompanying drawing in which:

FIG. 1 is a partially sectioned lateral elevation view of a centrifugal action device according to the invention.

FIG. 2 is an exploded view in a quite reduced scale of the device of FIG. 1;

FIG. 3 shows an enlarged constructive detail of the assembling system of the container of the device of FIG. 1; and FIG. 4 is a fragmentary view of the bottom of said container.

The illustrated device for grinding different types of foodstuffs consists of a base piece 1, enclosing an electric motor, the drive shaft 2 of which has the upper end protruding upwards fixed to a circular plate or disk 3 formed with peripheral holes 4 each suited to receive a spring 5 as clearly represented in FIG. 3. The motor may be a single phase induction electric motor provided with a starting circuit and operable by means of a switch 6 protruding from a vertical member 7 laterally attached to the base 1. Said vertical member 7 extends upwards into a column 8, the upper end of which carries pivoted thereto an arm 9, the purpose of which will be described later.

The container 10 supported on a rib of the disk 3 is snap mounted on said disc 3. Said container 10 comprises a solid bottom 11 provided with formed pins 12, which are secured thereto as by flange portions 30 (best shown in FIGURE 3). Pins 12 extend downwards (as best shown in FIGURE 2) and are suited to snap into the holes 4 of the disk 3. Pointed elements or teeth 13 protrude upwards from bottom 11 and are preferably fixed to the bottom 11 as by welding.

The container 10 further comprises a lateral perforated cylindrical band 14 suited to expel the liquid from said container. A flange 15 of nylon or similar material or a metallic flange suited to prevent the liquid from splashing upwards is removably pressed on the upper end of the band 14. If a metallic flange 15 is provided, the latter consists of an annular strip formed with an edge extending downwards having slots made therein. Said strip has two stable positions, one directed upwards whereby the edge of said flange engages the upper edge of the cylindrical band, the other directed downwards whereby the edge of the flange disengages the upper edge of said cylindrical band. The base piece 1 carries mounted thereon a casing 16 surrounding the container 10 which is so shaped as to exhibit a channel 17 for collecting the liquid and leading it to an output opening 18. Opening 18 registers with the discharge slide 19 when the casing 16 is mounted in operative position. The casing 16 is open at its upper end and may be closed by a cover 20 held in position by the arm 9. This cover 20 is formed with an eccentric feed member formed of a hopper or of a feed funnel 21 extending within the container 10 into a tubular member 22, the lower end of which has pointed elements 23 cooperating with the pointed elements 13 of the bottom 11 of the container 10. The pointed elements 13 of the bottom 11 are directed towards the direction of rotation of the container (FIG. 4) while the pointed elements 23 of the discharge opening of the tubular element 22 are directed in the opposite direction so as to exert a braking action on the treated material. The cover 20 is furthermore formed with a seat 24 suited to receive a push button or passing pin 25 normally urged by the action of a spring 26 into the outward position and which may be pushed in opposition to the spring 26 so as to be urged to slide against the flange 15 of the container 10 thus acting as a brake.

The operation of the specified device takes place as follows:

When the various component parts are mounted as shown in FIG. 1 the motor is started while the product to be ground is fed through the hopper 21 into the container 10. The container 10 being fixed to the disk 3 which in its turn is fixed to the drive shaft 2 will be set into rotation at a considerable speed so that the product will be ground between the cooperating pointed elements 23 and 13. The juice is urged by centrifugal force against the cylindrical band 14 and will pass through the perforations of the same, collecting into the channel 17 wherefrom it passes to the output opening 18 and to the discharge slide 19 which opens into a collecting container. Also the fruit's peels or the other toughest parts, which especially when the fruits are not very fresh tend to become detached from the pulp, get perfectly ground as a result of the particular configuration of the pointed elements 23—13.

Upon having treated and ground the desired product quantity the motor is stopped. Because of the improved assemblage system of my invention, container 10 will gradually stop with a smooth deceleration movement. Should it be desired to shorten the period of time required for completely stopping the container 10, (i.e. in the case where the motor is not selfbraking), brake 25 may be operated.

For cleaning the used device before putting it aside or using it again for treating another product it is necessary to disengage the arm 9 and to remove the cover 20. Container 10 and the casing 16 may now be disassembled. The removal of each of said pieces takes place independently of the others, so that the container 10 may be removed at will before or after the casing 16. The container 10 is removed by gripping on the flange 15 and pulling it upwards so as to release the pins 12 out of their seats 4. The upper flange 15 is then removed from the container whereby the cleaning of the inner face of the band 14 of the container 10 is greatly simplified. It should be noted that in the conventional grinding machines the cleaning operation is complicated by the fact that said band is curved inwards at the upper end to prevent the liquid from splashing upwards.

While a preferred embodiment of the invention has been described many variations will readily suggest themselves to those skilled in the art. It is apparent that many modifications and variants may be made to the specified device in its whole as well as in its details to comply with the practical requirements without thereby departing from the spirit and scope of the appended claims.

What is claimed is:

1. Centrifugal action device for grinding fruits, vegetables and other foodstuffs characterized in that it comprises: a base piece; said base piece enclosing a motor; said motor having a vertical drive shaft, a substantially planar member, the upper end of said drive shaft protruding upwards and fixed to said substantially planar member; a container formed with a solid bottom adapted to be removably snap-fixed to said planar member; said container having peripherally spaced means for removably connecting said container to said planar member; a cylindrical perforated band like element fastened to the edge of said solid bottom; a casing surrounding said container, mounted to be quickly removable from said base piece and provided with an output opening, said casing having an open end; a cover provided with a tubular member for the feeding into the container of the products to be ground, said casing open end being adapted to be closed by said cover; said feeding tubular member being provided with teeth at its discharge opening, other teeth provided at the bottom of said container cooperating with said first-mentioned teeth, to grip and break the product, said last mentioned teeth being disposed in spaced relation with respect to the teeth of the feeding tubular member.

2. Device according to claim 1 characterized in that the pointed ends of the teeth of the container bottom are directed in the direction corresponding to the rotational sense of said container.

3. Device according to claim 1 characterized in that the pointed ends of the teeth of the feed tubular member are directed opposite to the direction of the teeth pointed ends on the container bottom.

4. Device according to claim 1 characterized in that the upper end of the container is provided with a flange of flexible material which may be pressed thereon so as to be easily disassembled, said flange serving for gripping the container as well as for preventing the liquid of said product being ground from splashing upwards out of said container.

5. Device according to claim 4 characterized in that the cover is formed with a seat slidingly receiving a pin or push button suited to press on the flange of the container to brake said flange, said pin being normally urged by a spring into a disengagement position from the flange.

6. Device according to claim 1 characterized in that a vertical member extends laterally from said base piece, said vertical member extending upwards into a column, the upper end of which is pivoted to the end of an arm provided for blocking the cover.

7. Device according to claim 1 characterized in that said base piece is formed with a seat for the fastening thereto of an inclined discharge member situated below the output opening.

8. Centrifugal action device for grinding fruits, vegetables, and other foodstuffs, characterized in that it comprises: a base piece; said base piece enclosing a motor; said motor having a vertical drive shaft; a substantially planar member; the upper end of said drive shaft protruding upwards and fixed to said substantially planar member; a container formed with a solid bottom adapted to be affixed to said planar member in a manner to substantially reduce vibration and effect rapid assembly and disassembly thereof; said container having peripherally spaced means for removably connecting said container to said planar member; a cylindrical perforated band-like element fastened to the edge of said solid bottom; a casing surrounding said container mounted to be quickly removable from said base piece and provided with an output opening; said casing having an open end; a cover provided with a tubular member for the feeding into the container of the products to be ground; said casing open end adapted to be closed by said cover; said feeding tubular member being provided with teeth at its discharge opening; other teeth provided at the bottom of said container cooperating with said first-mentioned teeth to grip and brake the product, said container teeth being disposed along a generally spiral path; said last mentioned teeth being disposed in spaced-apart generally planar relationship with respect to the teeth of the feeding tubular member to permit rapid sharpening thereof.

References Cited in the file of this patent

UNITED STATES PATENTS

| | | |
|---|---|---|
| 2,273,093 | Drachenberg | Feb. 17, 1942 |
| 2,289,656 | Knapp | July 14, 1942 |
| 2,295,922 | Weston | Sept. 15, 1942 |
| 2,297,880 | Fredrickson | Oct. 6, 1942 |
| 2,304,929 | Keith | Dec. 15, 1942 |
| 2,845,971 | Cordero | Aug. 5, 1958 |